United States Patent
Kang et al.

(10) Patent No.: US 11,520,483 B2
(45) Date of Patent: Dec. 6, 2022

(54) OPERATING METHOD FOR PERFORMING FIRMWARE IMAGE CHUNK UPDATE AND VERIFICATION OF WHETHER DAMAGE AS OCCURRED ON STORAGE DEVICE

(71) Applicant: SAMSUNG ELECTRONICS CO., LTD., Suwon-si (KR)

(72) Inventors: Soohwan Kang, Hwaseong-si (KR); Jaesub Kim, Seoul (KR); Jeongbeom Seo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 17/198,353

(22) Filed: Mar. 11, 2021

(65) Prior Publication Data

US 2022/0091750 A1 Mar. 24, 2022

(30) Foreign Application Priority Data

Sep. 24, 2020 (KR) .................. 10-2020-0124071

(51) Int. Cl.
*G06F 3/06* (2006.01)
*G06F 8/65* (2018.01)
*G06F 9/445* (2018.01)

(52) U.S. Cl.
CPC .......... *G06F 3/0607* (2013.01); *G06F 3/0656* (2013.01); *G06F 3/0659* (2013.01);
(Continued)

(58) Field of Classification Search
CPC .... G06F 3/0656; G06F 3/0659; G06F 3/0679; G06F 8/65; G06F 9/44589
See application file for complete search history.

(56) References Cited

U.S. PATENT DOCUMENTS 8,375,064 B2   2/2013   Jaquette et al.
8,607,216 B2   12/2013  Ibrahim et al.
(Continued)

FOREIGN PATENT DOCUMENTS

JP      10161881 A    6/1998
JP        113213 A    1/1999
(Continued)

OTHER PUBLICATIONS

Benkraouda Hadjer et al: "SNIFU: Secure Network Interception for Firmware Updates in legacy PLCs", 2020 IEEE 38th VLSI Test Symposium (VTS), IEEE, Apr. 5, 2020 (Apr. 5, 2020), pp. 1-6, XP033777274, DOI: 10.1109/VTS48691.2020.9107609.

(Continued)

*Primary Examiner* — Tammara R Peyton
(74) *Attorney, Agent, or Firm* — Volentine, Whitt & Francos, PLLC

(57) ABSTRACT

A controller is included in a storage device communicating with a host device. The controller is configured to receive a firmware image download command and a firmware image corresponding to the firmware image download command from the host device, perform verification for determining whether the firmware image is damaged in response to the received firmware image download command, and when a firmware update request for the firmware image is received from the host device, determine whether to perform a firmware update based on the firmware image by using a verification result of the firmware image.

15 Claims, 13 Drawing Sheets

(52) U.S. Cl.
CPC .............. *G06F 3/0679* (2013.01); *G06F 8/65* (2013.01); *G06F 9/44589* (2013.01)

(56) References Cited

U.S. PATENT DOCUMENTS

| | | | |
|---|---|---|---|
| 9,858,067 | B2 | 1/2018 | Ozturk et al. |
| 10,206,114 | B2 | 2/2019 | Choi et al. |
| 10,997,297 | B1 * | 5/2021 | Lin .......................... H04L 9/30 |
| 2005/0102669 | A1 | 5/2005 | Marney et al. |
| 2006/0067525 | A1 | 3/2006 | Hartlage |
| 2012/0102477 | A1 | 4/2012 | Kim et al. |
| 2020/0202002 | A1 * | 6/2020 | Graham ................ G06F 21/575 |

FOREIGN PATENT DOCUMENTS

| | | |
|---|---|---|
| KR | 100713971 | 5/2007 |
| KR | 1020120041384 | 5/2012 |
| KR | 101373574 | 3/2014 |
| KR | 1020150106219 | 7/2020 |

OTHER PUBLICATIONS

European Search Report dated Jan. 11, 2022 Cited in Corresponding EP Patent Application No. 21185935.0.

* cited by examiner

OPERATING METHOD FOR PERFORMING FIRMWARE IMAGE CHUNK UPDATE AND VERIFICATION OF WHETHER DAMAGE AS OCCURRED ON STORAGE DEVICE

CROSS-REFERENCE TO RELATED APPLICATION

This U.S. nonprovisional patent application is based on and claims priority under 35 U.S.C. § 119 to Korean Patent Application No. 10-2020-0124071, filed on Sep. 24, 2020 in the Korean Intellectual Property Office, the disclosure of which is incorporated by reference herein in its entirety.

BACKGROUND

The inventive concept(s) described herein relate to a storage device, and particularly, to a storage device for performing a firmware update and an operating method of the storage device.

Storage devices may be driven with firmware. When firmware is stored in read only memory (ROM) of a storage device, the stored firmware may be difficult to correct. When firmware is stored in flash memory, firmware stored in the storage device may be corrected or updated.

When a storage device is provided with an updated firmware image from a host device, an operation of verifying whether the updated firmware image received by the storage device is valid is first performed. When the updated firmware image is not abnormal, an update may be performed by using a corresponding firmware image.

As the capacity of a memory device in storage devices increases, the size of a firmware image used to drive storage devices increases. When the size of a firmware image increases, the time for verifying the updated firmware image may increase.

SUMMARY

The inventive concept(s) described herein include a storage device and an operating method of the storage device for performing a firmware update operation in which a firmware update time is decreased by verifying each of divided firmware images as soon as the divided firmware images are received.

According to an aspect of the inventive concept(s) described herein, a controller is included in a storage device communicating with a host device. The controller is configured to receive a firmware image download command and a firmware image corresponding to the firmware image download command from the host device, and obtain a verification result by performing verification for determining whether the firmware image is damaged in response to the received firmware image download command. When a firmware update request for the firmware image is received from the host device, the controller is configured to determine whether to perform a firmware update based on the firmware image by using the verification result.

According to another aspect of the inventive concept(s) described herein, a firmware update method of a storage device includes receiving a firmware image download command and a firmware image corresponding to the firmware image download command from a host device, and obtaining a verification result by performing verification for determining whether the firmware image is damaged in response to the received firmware image download command. The firmware update method also includes receiving a firmware update request for the firmware image from the host device, and checking the verification result to determine whether to perform a firmware update based on the firmware image, based on the verification result.

According to another aspect of the inventive concept(s) described herein, a storage device for performing a firmware update includes a memory device and a controller. The controller is configured to receive a firmware image download command and a firmware image corresponding to the firmware image download command from a host device, obtain a verification result by performing verification for determining whether the firmware image is damaged based on the received firmware image download command, receive a firmware update request for the firmware image from the host device, and check the verification result. When the firmware image is determined to be valid as a result of checking the verification result, the controller is configured to store the firmware image in the memory device. The firmware update is performed based on the firmware image stored in the memory device.

BRIEF DESCRIPTION OF THE DRAWINGS

Embodiments of the present disclosure will be more clearly understood from the following detailed description taken in conjunction with the accompanying drawings in which.

DETAILED DESCRIPTION OF THE EMBODIMENTS

Hereinafter, embodiments will be described in detail with reference to the accompanying drawings.

Figure 1:
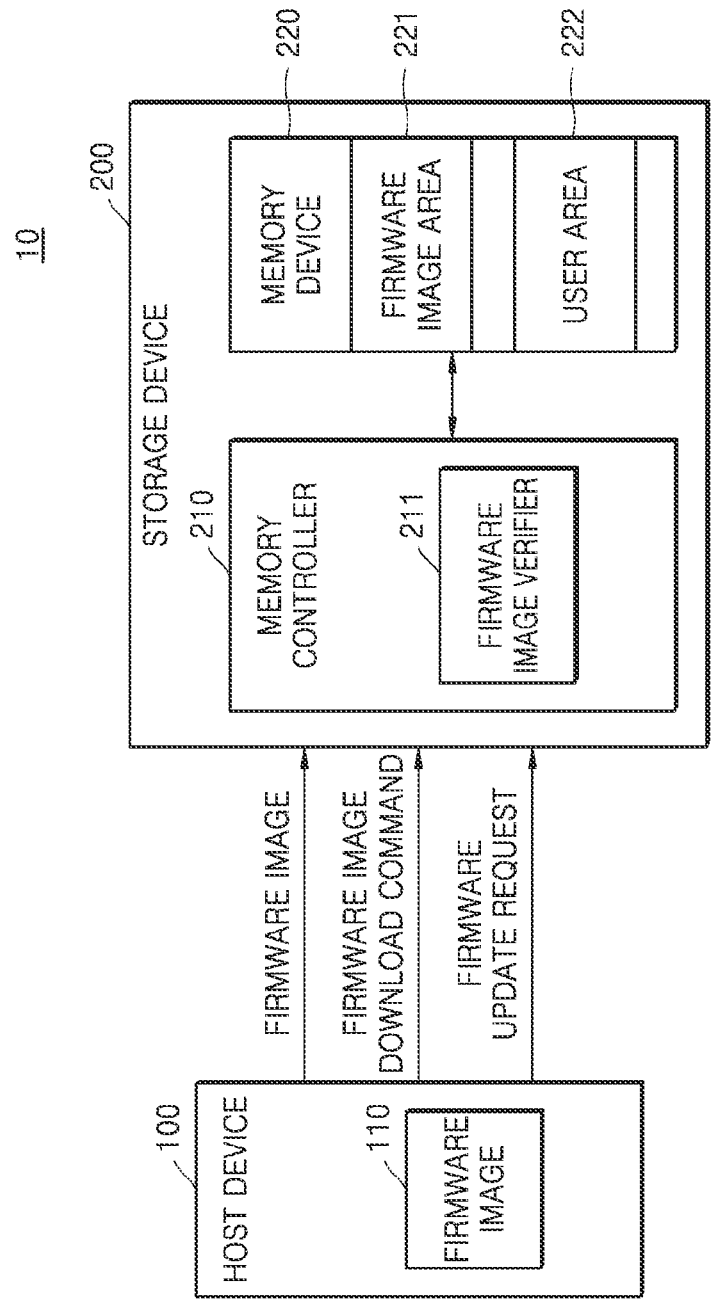
FIG. 1 is a block diagram illustrating a data processing system according to an embodiment.

FIG. 1 is a block diagram illustrating a data processing system 10 according to an embodiment.

Referring to FIG. 1, the data processing system 10 may include a host device 100 and a storage device 200.

The host device 100 may transmit firmware to the storage device 200. The storage device 200 may control internal hardware of the storage device 200 based on the firmware received thereby. When firmware is stored in the storage device 200 and firmware of an updated version corresponding to the stored firmware is received, the storage device 200 may update the stored firmware to the received firmware.

A software image may be considered a copy of the entirety of a software system. Firmware may be a type of a software image. Therefore, firmware provided to the storage device 200 by the host device 100 may be referred to as a firmware image 110.

For example, the host device 100 may transmit, to the storage device 200, a firmware image download request (or a firmware image download command) and the firmware image 110, which is to be downloaded. The host device 100 may be provided separate from the storage device 200, and connected via a data connection such as via a wired or wireless interface. Alternatively, the host device 100 may be integrated with the storage device 200, such as by being fully or partially housed within the same housing or by being otherwise directly and physically connected.

As another example, the host device 100 may store the firmware image download command in a submission queue of the host device 100. At this time, information about the firmware image 110 corresponding to the firmware image download command may be stored in the submission queue also. The storage device 200 may obtain the firmware image 110 based on pieces of the information about the firmware image 110 stored in the submission queue. The host device 100 may transmit the firmware image 110 to the storage device 200 by using various methods, and a transmission method is not limited to transmission by the host device 100 or retrieval by the storage device 200 based on the pieces of the information about the firmware image 110 stored in the submission queue.

The host device 100 may divide the firmware image 110 and may transmit a divided firmware image 110 to the storage device 200. For example, when a size of the firmware image 110 is greater than a criterion, the firmware image 110 may be divided into a plurality of image pieces. A criterion of division is not limited to a threshold criterion. Herein, for convenience, each of the divided firmware images may be referred to as a firmware image chunk. The host device 100 may transmit, to the storage device 200, a firmware update request for the transmitted firmware image 110. For example, the firmware update request may be a firmware commit command that is transmitted subsequent to the firmware download command and subsequent to the storage device 200 performing verification for the firmware image. The storage device 200 may therefore receive firmware image chunks, obtained through division by the host device 100, from the host device 100. As another example, the present invention is not limited thereto, and the firmware download command and the firmware commit command need not be continuously transmitted. For example, without receiving the firmware download command, the firmware commit command may be independently received based on the firmware image chunks received in the past.

A firmware commit command according to a comparative example may denote a command which allows the storage device 200 to verify whether the firmware image 110 received thereby is damaged or valid. When the firmware image 110 is valid, the firmware commit command may allow the storage device 200 to store the firmware image 110 in a memory device 220 of the storage device 200 to update a stored firmware image 110 to the received firmware image 110.

A firmware commit command according to some embodiments may include a command for obtaining a verification result by checking a result of performed verification, instead of a command for the storage device 200 to verify the received firmware image 110. The firmware commit command may include a command which allows the storage device 200 to store the firmware image 110 in the memory device 220 to perform an update, based on a verification result.

An operation of the storage device 200 may be changed based on a type of a commit action included in the firmware commit command.

The storage device 200 may include a memory controller 210 and the memory device 220.

The memory controller 210 may include a processor, such as a microprocessor, to execute instructions to implement some or all of the functions and characteristics attributed to the memory controller 210 herein. The memory controller 210 may also include a local memory dedicated to the memory controller 210 and which stores instructions executed by the processor, such as a read-only memory (ROM). An example of a memory controller 210 with such a processor 340 and with such a ROM 330 is explained below with respect to FIG. 5. The memory controller 210 may include a firmware image verifier 211, which performs verification on a firmware image 110 or a firmware image chunk provided from the host device 100. The firmware image verifier 211 may check whether the firmware image 110 is damaged and/or whether the firmware image chunk is damaged. For example, the firmware image verifier 211 may check integrity or validity. For example, a method of checking integrity may use a checksum manner, a hash function manner, an electronic signature manner, or a message authentication code (MAC) manner. However, the kind of verification is not limited to these methods.

The firmware image verifier 211 may perform verification of the firmware image chunk received along with the firmware image download command before receiving the firmware update request.

The memory controller 210 may store the firmware image 110, on which verification is completed by the firmware image verifier 211, in the memory device 220 based on the firmware update request.

The memory device 220 may include a firmware image area 221 with the firmware image 110 stored therein and a user area 222 with user data stored therein.

According to the comparative example, when the firmware image 110 is divided into a plurality of firmware image chunks, all of the firmware image chunks may be transmitted to the storage device 200, and then, verification of a firmware image may be performed based on the firmware update request. In this case, much time may be taken until an update is performed based on the firmware image 110 from a time at which the firmware update request is received. This may be because verification of the firmware image 110 starts after the firmware update request is transmitted to the storage device 200.

According to some embodiments, when the firmware image 110 is divided into a plurality of firmware image chunks and the firmware image download command and each of the firmware image chunks are transmitted to the storage device 200, the storage device 200 may not wait for until all of the firmware image chunks are transmitted and may perform verification on a received firmware image chunk whenever each firmware image chunk is received.

That is, the storage device 200 may start verification when the firmware image download command is received, without receiving the firmware update request.

Therefore, when the firmware update request is transmitted to the storage device 200, separate verification is not performed on a firmware image based on the firmware update request. As a result, a time before the storage device 200 performs an update based on the firmware image 110 from after a time at which the storage device 200 receives the firmware update request may be reduced.

The storage device 200 may include a plurality of storage mediums for storing data based on a request from the host device 100. For example, the storage device 200 may include one or more solid state drives (SSDs). When the storage device 200 includes an SSD, the memory device 220 may include a plurality of flash memory chips (for example, NAND memory chips) which non-volatilely store data. The memory device 220 may correspond to one flash memory device, or may include a memory card including one or more flash memory chips.

When the storage device 200 includes flash memory, the flash memory may include a two-dimensional (2D) NAND memory array or a three-dimensional (3D) NAND (or vertical NAND (VNAND)) memory array. The 3D memory array may be a circuit that includes arrays of memory cells including an active area disposed on a silicon substrate and is associated with an operation of each of the memory cells, and may be configured in a monolithic type on a physical level of at least one of memory cell arrays each including a circuit which is provided on or in the substrate. The monolithic type may denote that layers of levels configuring an array are stacked directly on layers of lower levels of the array.

In some embodiments, the 3D memory array may include a plurality of vertical NAND strings which are arranged in a vertical direction in order for at least one memory cell to be disposed on another memory cell. The at least one memory cell may include a charge trap layer.

U.S. Pat. Nos. 7,679,133, 8,553,466, 8,654,587 and 8,559,235 and U.S. Patent Application Publication No. 2011/0233648 disclose appropriate elements of a 3D memory array which includes a plurality of levels and in which word lines and/or bit lines are shared between the plurality of levels. In the present specification, the reference documents may be incorporated herein by reference.

As another example, the storage device 200 may include various kinds of different memories. For example, the storage device 200 may include a non-volatile memory, and the non-volatile memory may include various kinds of memories such as magnetic random access memory (RAM) (MRAM), spin-transfer torque MRAM, conductive bridging RAM (CBRAM), ferroelectric RAM (FeRAM), phase RAM (PRAM), resistive RAM, nanotube RAM, polymer RAM (PoRAM), nano floating gate memory (NFGM), holographic memory, molecular electronic memory, and insulator resistance change memory.

For example, the memory device 220 may include an embedded multi-media card (eMMC) or an embedded universal flash storage (UFS) memory device. For example, the memory device 220 may include an external memory detachably attached to the storage device 200. In detail, the memory device 220 may include a UFS memory card, a compact flash (CF) card, a secure digital (SD) card, a micro secure digital (micro-SD) card, a mini secure digital (mini-SD) card, an extreme digital (xD) card, or a memory stick, but is not limited to these forms of memory cards or types of memory.

The host device 100 may communicate with the storage device 200 through various interfaces. For example, the host device 100 may communicate with the storage device 200 through various interfaces such as universal serial bus (USB), multi-media card (MMC), peripheral component interconnection (PCI), PCI express (PIC-E), advanced technology attachment (ATA), serial-ATA (SATA), parallel-ATA (PATA), small computer system interface (SCSI), serial attached SCSI (SAS), enhanced small disk interface (ESDI), integrated drive electronics (IDE), and non-volatile memory express (NVMe).

Figure 2:
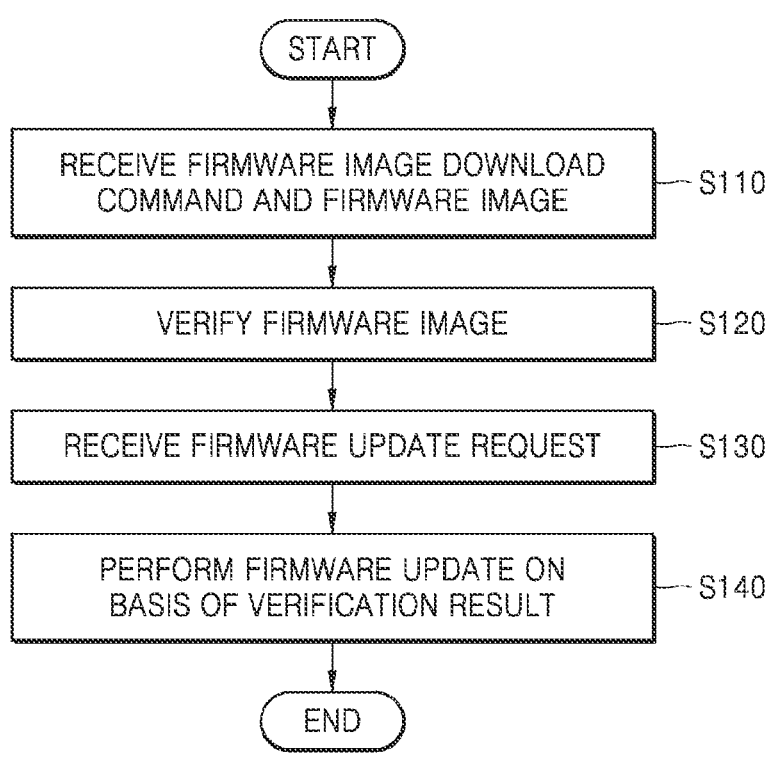
FIG. 2 is a flowchart illustrating an operating method of a memory controller, according to an embodiment.

FIG. 2 is a flowchart illustrating an operating method of a memory controller 210, according to an embodiment.

Referring to FIGS. 1 and 2, the memory controller 210 may receive a firmware image download command and a firmware image 110, which is to be downloaded, from the host device 100 in operation S110. The firmware image download command according to some embodiments may further instruct the storage device 200 to perform verification on the downloaded firmware image 110 immediately, unlike a general firmware image download command.

The memory controller 210 may store the received firmware image 110 in a buffer memory. Examples of a buffer memory include a buffer memory 350 in FIG. 5 which is shown to include an image buffer 213 of FIG. 4.

The memory controller 210 may perform verification on the received firmware image 110 in operation S120. That is, the memory controller 210 may receive the firmware image download command. As a result, the memory controller 210 may start to perform verification on the firmware image 110 stored in the buffer memory. A checksum manner, a hash function manner, an electronic signature manner, an MAC manner, or an Rivest Shamir Adleman (RSA) authentication manner may be used for determining whether the firmware image 110 is damaged or is generated by an unauthenticated user. However, various verification algorithms may be used for performing authentication.

The memory controller 210 may receive the firmware image download command, and then, may receive a firmware update request from the host device 100. The firmware update request may denote a firmware commit command.

For example, the firmware commit command according to some embodiments does not include a command for inspecting the validity of the firmware image 110, unlike a general firmware commit command. As another example, the firmware commit command according to some embodiments does include the command for inspecting the validity of the firmware image 110, like the general firmware commit command, in which case the storage device 200, which has received the firmware commit command, may check a stored verification result, for inspecting the validity of the firmware image 110.

The firmware commit command according to some embodiments may include a command which allows the storage device 200 to store a verification-completed firmware image 110 in the memory device 220 of the storage device 200 and to perform a firmware update by using the verification-completed firmware image 110.

When the firmware commit command is received, the storage device 200 according to some embodiments does not perform separate verification on the firmware image 110 and may check a result of performed verification, store the firmware image 110, and perform a firmware update. Therefore, a time for executing the firmware commit command may be reduced.

In operation S140, the memory controller 210 may perform a firmware update based on a result of verification, which has been performed on the firmware image 110 in operation S120. For example, when verification performed on the validity or integrity of the firmware image 110 succeeds, a validity-verified firmware image 110 may be stored in the memory device 220, and firmware of the storage device 200 may be updated with the validity-verified firmware image 110. As another example, when the verification performed on the firmware image 110 fails, the firmware image 110 is not stored in the memory device 220.

Figure 3:
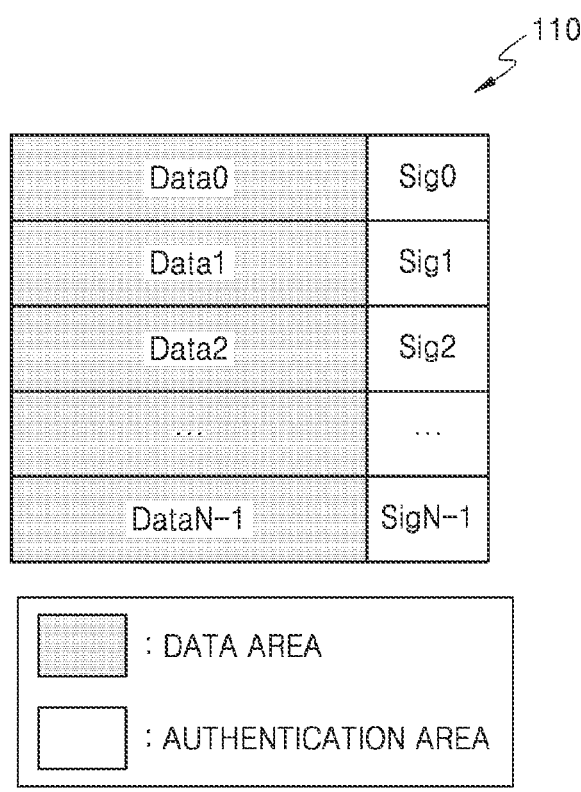
FIG. 3 is an exemplary diagram illustrating a firmware image according to an embodiment.

FIG. 3 is an exemplary diagram illustrating a firmware image 110 according to an embodiment.

Referring to FIG. 3, the firmware image 110 may include pieces of data Data0 to DataN−1 and pieces of authentication information Sig0 to SigN−1 corresponding to the pieces of data Data0 to DataN−1. The pieces of data Data0 to DataN−1 may be stored in a data area, and the pieces of authentication information Sig0 to SigN−1 may be stored in a signature area. Therefore, in the specification, for convenience, authentication information may be referred to as a signature. Additionally, the firmware image 110 may be considered to include a data area including firmware update information and an authentication area including authentication information.

The pieces of data Data0 to DataN−1 may be or include information needed for updating firmware, and may each be or include a code needed for performing a firmware update, and for example, may be a binary type.

The pieces of authentication information Sig0 to SigN−1 may include pieces of information needed for performing verification on the firmware image 110. For example, the pieces of authentication information Sig0 to SigN−1 may include an authentication signature. The pieces of authentication information Sig0 to SigN−1 may be changed based on a verification method performed on the firmware image 110. For example, when RSA authentication is performed, a hash value may be obtained by applying a hash function to the pieces of data Data0 to DataN−1, and a result obtained by encrypting the obtained hash value with a private key may be added to the pieces of authentication information Sig0 to SigN−1.

The firmware image 110 may include the pieces of authentication information Sig0 to SigN−1 respectively corresponding to the pieces of data Data0 to DataN−1. For example, information needed for performing authentication on first data Data0 may be first authentication information Sig0. For example, the first authentication information Sig0 may include an encryption key such as a public key or a private key for verifying the first data Data0.

The firmware image 110 may be divided into a plurality of firmware image chunks by the host device 100. Each of the firmware image chunks may include data or authentication information. However, when a firmware image chunk includes certain data, the firmware image chunk does not necessarily include authentication information corresponding to the certain data. For example, one firmware image chunk may include only the first data Data0 and not authentication information, and another firmware image chunk may include first authentication information corresponding to the first data Data0 and second data Data1.

The firmware image 110 may further include a plurality of regions which are not illustrated in FIG. 3, and for example, may include a region where a bootloader is stored.

Figure 4:
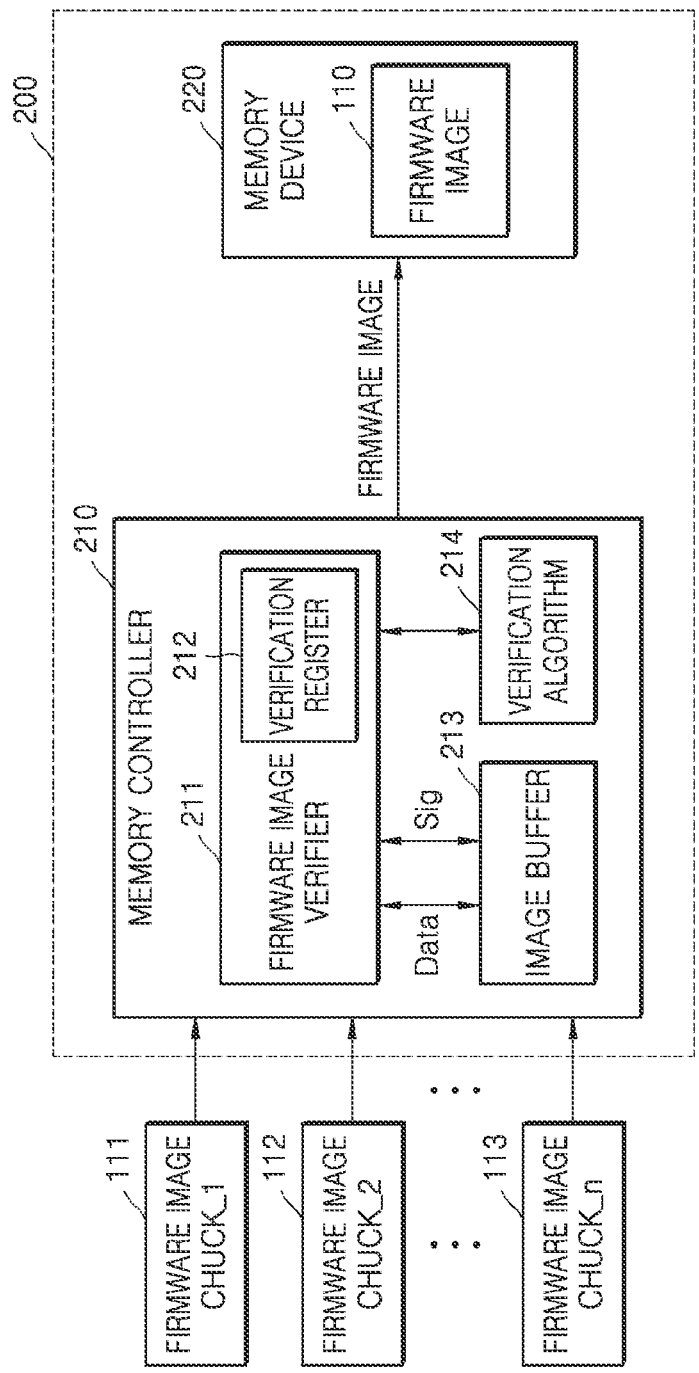
FIG. 4 is a concept diagram illustrating an operation of a memory controller according to an embodiment.

FIG. 4 is a concept diagram illustrating an operation of a memory controller 210 according to an embodiment.

Referring to FIGS. 1 and 4, the memory controller 210 may include a firmware image verifier 211, a verification register 212, an image buffer 213, and a verification algorithm 214.

Based on a plurality of firmware image download commands, the firmware image verifier 211 may receive a plurality of firmware image chunks 111 to 113 from the host device 100 and may store each of the firmware image chunks 111 to 113 in the image buffer 213. The image buffer 213 may be considered to include a first area configured to store the firmware update information of the firmware image 110 and a second area configured to store the authentication information of the firmware image 110. The firmware update information may include data Data and the authentication information may include signature Sig for firmware image chunks.

The firmware image verifier 211 may use data Data and a signature Sig of a firmware image chunk, for verifying whether the firmware image chunks stored in the image buffer 213 are damaged. The data Data may denote information included in a data area of a firmware image chunk, and the signature Sig may denote information included in a signature area of a firmware image chunk.

The firmware image verifier 211 may obtain pieces of data and signatures of the plurality of firmware image chunks 111 to 113 stored in the image buffer 213.

The firmware image verifier 211 may perform verification on the validity or integrity of the firmware image 110 by using the verification algorithm 214. That is, the firmware image verifier 211 may apply the verification algorithm 214 to the pieces of data and the signatures of the plurality of firmware image chunks, so that the memory controller 210 performs verification on a validity of data stored in the first area of the image buffer 213 based on the authentication information stored in the second area of the image buffer 213.

For example, the firmware image verifier 211 may decode the signature Sig obtained from the image buffer 213 with a public key to obtain a hash value and may compare the obtained hash value with a hash value obtained by applying a hash function to the data Data obtained from the image buffer 213. Whether the data Data is/are damaged may be determined based on a result of the comparison.

The firmware image verifier 211 may store a verification result of the data Data in the verification register 212.

The verification register 212 may store a verification result of each of the plurality of firmware image chunks 111 to 113. For example, the verification register 212 may represent a verification as a binary bit of 0 or 1 or as a flag. Using the verification register 212, the memory controller 210 may store verification results. The memory controller 210 may therefore be configured to store damage information about the firmware image 110 in the verification register 212.

For example, when a firmware image chunk_1 111 is damaged, the firmware image verifier 211 may set a bit, corresponding to the firmware image chunk_1 111 of the verification register 212, to 0. When a firmware image chunk_2 112 is determined to be normal as an integrity verification result of the firmware image chunk_2 112, the firmware image verifier 211 may set a bit, corresponding to the firmware image chunk_2 112 of the verification register 212, to 1. The memory controller 210 may store a verification result of the firmware image chunk_1 111 obtained through verification performed based on receiving the firmware image chunk_1 111. The controller may store a verification result of the firmware image chunk_2 112 obtained through verification performed based on receiving the firmware image chunk_2 112.

One firmware image 110 may be divided into n (where n is an integer of 2 or more) number of firmware image chunks 111 to 113, and the n firmware image chunks 111 to 113 may be sequentially transmitted to the storage device 200 by the host device 100. Whenever a firmware image chunk is received, the memory controller 210 may store the received firmware image chunk in the image buffer 213.

Whenever a new firmware image chunk is stored in the image buffer 213, the firmware image verifier 211 may perform verification. The firmware image verifier 211 may perform verification periodically, such as once at every predetermined period. In this case, the firmware image verifier 211 may perform verification on only a newly stored firmware image chunk and may perform verification on all firmware image chunks stored in the image buffer 213.

Despite a firmware image chunk determined to be valid at a verification time, the firmware image chunk may be damaged in the image buffer 213. The firmware image verifier 211 may verify all firmware image chunks stored in the image buffer 213. As a result, the firmware image verifier 211 may identify a damaged firmware image chunk by checking the firmware image chunk which is damaged in the image buffer 213.

In FIG. 4, the verification register 212 is illustrated as being in the firmware image verifier 211 and the verification algorithm 214 is illustrated as being outside the firmware image verifier 211, but the teachings of the present disclosure are not limited to these configurations of a verification register 212. Also, the image buffer 213 is illustrated as being in the memory controller 210, but the teachings of the present disclosure are not limited to these configurations of an image buffer 213 and the image buffer 213 may be outside the memory controller 210.

One firmware image 110 may be divided into the n firmware image chunks 111 to 113, and all of the n firmware image chunks 111 to 113 may be transmitted to the storage device 200 and may succeed in verification. At this time, when the storage device 200 receives a firmware update request from the host device 100, the memory controller 210 may store the n firmware image chunks 111 to 113, stored in the image buffer 213, in the memory device 220. At this time, the n firmware image chunks 111 to 113 may be stored as the one firmware image 110 in the memory device 220.

Subsequently, the memory controller 210 may perform a firmware update by using the firmware image 110 stored in the memory device 220.

Figure 5:
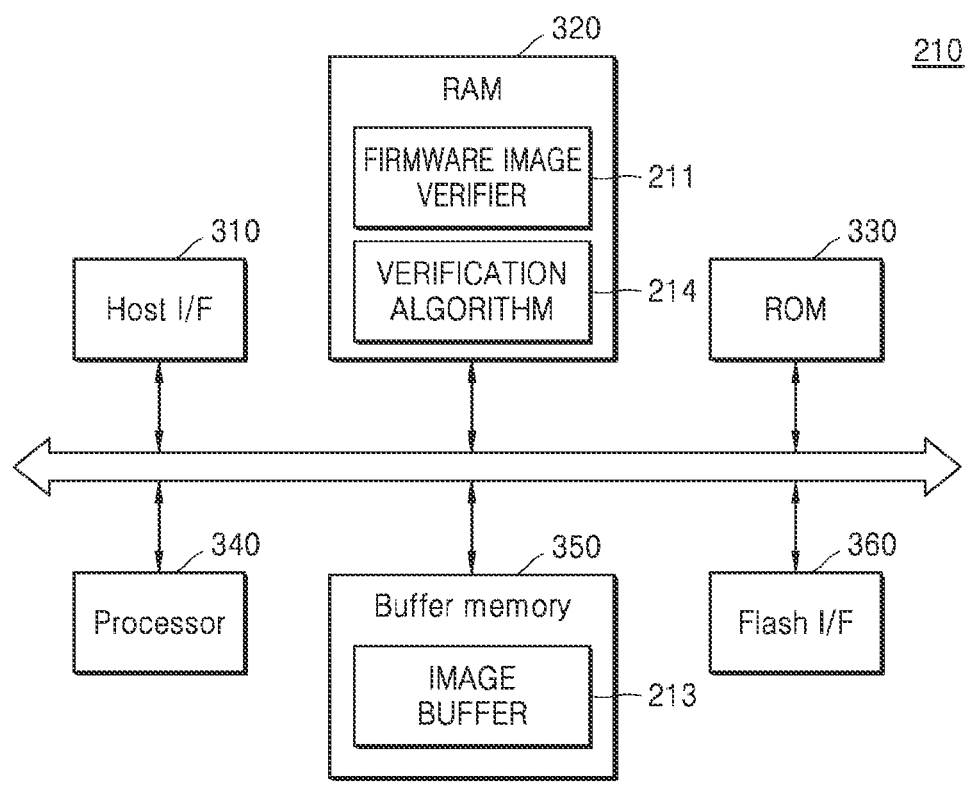
FIG. 5 is a block diagram illustrating a memory controller according to an embodiment.

FIG. 5 is a block diagram illustrating a memory controller 210 according to an embodiment.

Referring to FIGS. 1 and 5, the memory controller 210 may include a host interface 310 (Host I/F), RAM 320 (random access memory), ROM 330 (read only memory), a processor 340, a buffer memory 350, and a flash interface 360 (Flash I/F). The ROM 330 may store instructions that are executed by the processor 340 to implement some or all aspects of functions and characteristics attributed to the memory controller 210 herein. The processor 340 may be or include a microprocessor, or may be or include an application-specific integrated circuit (ASIC).

According to some embodiments, the host interface 310 may communicate with the host device 100 to receive various requests and transmit various information. For example, the host interface 310 may receive a firmware image download command, a firmware commit command, a firmware image 110, or a firmware image chunk from the host device 100.

Unlike a conventional firmware image download command, the firmware image download command according to some embodiments herein may include a command for verifying the firmware image 110. Unlike a conventional firmware commit command, the firmware commit command according to some embodiments herein does not include the command for verifying the firmware image 110. Through an initial connection process or a protocol setting process of the host device 100 and the storage device 200, content of a command may be stored in the RAM 320 or the ROM 330 of the memory controller 210.

The host interface 310 may perform communication based on a certain interface with the host device 100, and for example, may communicate with the host device 100 based on various kinds of interfaces such as an NVMe interface and a UFS interface.

The RAM 320 may include a firmware image verifier 211 and a verification algorithm 214.

The firmware image verifier 211 may store the firmware image 110 or firmware image chunks, received from the host device 100 through the host interface 310, in the image buffer 213 of the buffer memory 350. The firmware image verifier 211 may verify pieces of information stored in the image buffer 213 by using the verification algorithm 214. Information to be verified may include one normal firmware image 110, or may include one or more firmware image chunks received from the host device 100. The information to be verified may include data or a signature of the firmware image 110, or may include all of the data and the signature.

The verification algorithm 214 may be used to determine whether pieces of information stored in the image buffer 213 is/are valid or damaged. In FIG. 5, the verification algorithm 214 is illustrated as being in the RAM 320, but a location at which the verification algorithm 214 is stored is not limited to placement in the RAM 320.

The firmware image verifier 211 may store a verification result of each of the pieces of information stored in the image buffer 213. The verification result may be stored in the buffer memory 350, or may be stored in a separate register.

The ROM 330 may include a read-dedicated memory which stores a program executed by the processor 340. A program for implementing an operation of the memory controller 210 or firmware with the program recorded therein may be stored in the ROM 330. The verification algorithm 214 may be stored in the ROM 330.

The processor 340 may execute various programs stored in the ROM 330 to control all operations of the storage device 200. The processor 340 may execute a program configuring the firmware image verifier 211.

The buffer memory 350 may temporarily store data received from the host device 100 through the host interface 310 or data received from the memory device 220.

The buffer memory 350 may include an image buffer 213 which stores the firmware image chunks or the firmware image 110 received from the host device 100 through the host interface 310. When the image buffer 213 is outside the memory controller 210, the image buffer 213 may be included in a separate buffer memory (not shown) outside the memory controller 210.

The image buffer 213 may be logically and/or physically divided into a plurality of addressable areas. The image buffer 213 may divisionally store information, included in the firmware image 110 or a firmware image chunk, in each area based on an attribute of the information. Detailed descriptions are given with reference to FIG. 6.

A plurality of firmware image chunks or the firmware image 110 stored in the image buffer 213 may be stored in the memory device 220 by the memory controller 210. When the host interface 310 receives a firmware commit command from the host device 100, the firmware image verifier 211 may check a stored verification result and may store the firmware image 110, stored in the image buffer 213, in the memory device 220 based on the verification result.

The buffer memory 350 may be implemented with a volatile memory, such as dynamic random access memory (DRAM), static random access memory (SRAM), double data rate synchronous dynamic random access memory (DDR SDRAM), low power DDR (LPDDR) SDRAM, or graphic RAM (GRAM), or a non-volatile memory such as FRAM, ReRAM, STT-MRAM, or PRAM.

The flash interface 360 may be configured to control signals for driving the memory device 220 and to access the memory device 220 based on control by the processor 340. The flash interface 360 may be configured to selectively perform software and hardware interleave operations through at least one channel.

Also, the flash interface 360 may provide an interface with each of a plurality of storage mediums included in a storage device, and for example, the flash interface 360 may perform independent communication with the storage mediums through a plurality of channels.

The flash interface 360 may store the firmware image 110, stored in the image buffer 213, in the memory device 220.

In FIG. 5, an example is illustrated in which a firmware image verifying operation is performed by software, but embodiments are not limited thereto. For example, in the embodiment illustrated in FIG. 5, at least some of operations performed by executing software loaded into the RAM 320 and the ROM 330 may instead be performed through a circuit implemented with hardware.

Figure 6:
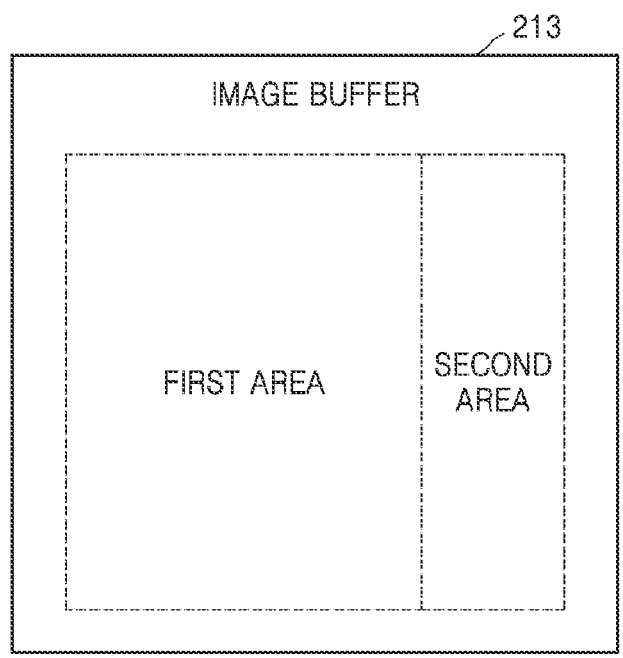
FIG. 6 is an exemplary diagram illustrating an image buffer according to an embodiment.

FIG. 6 is an exemplary diagram illustrating an image buffer 213 according to an embodiment.

Referring to FIGS. 1, 3, and 6, the image buffer 213 may include a first area and a second area. The image buffer 213 may divisionally store information (i.e., pieces of data Data0 to DataN−1), included in a data area of the firmware image 110 received from the host device 100, and information (i.e., signatures Sig0 to SigN−1) included in a signature area of the firmware image 110.

For example, the image buffer 213 may store data of the firmware image 110 in the first area and may store a signature of the firmware image 110 in the second area.

When the firmware image 110 is divided into n number of firmware image chunks, the image buffer 213 may store data of a received firmware image chunk in the first area and may store a signature of the firmware image chunk in the second area.

An example where the storage device 200 sequentially receives first firmware image chunks to third firmware image chunks will be described.

When the first firmware image chunk includes only first data Data0, the first firmware image chunk may be stored in the first area. When the second firmware image chunk includes only first signature Sig0, the second firmware image chunk may be stored in the second area.

As another example, when the third firmware image chunk includes second data Data1 and a third signature Sig2, the second data Data1 may be stored in the first area, and the third signature Sig2 may be stored in the second area.

The firmware image verifier 211 may selectively access the first area or the second area of the image buffer 213. The firmware image verifier 211 may obtain only pieces of information stored in the first area of the image buffer 213, or may obtain only pieces of information stored in the second area of the image buffer 213.

Whenever new pieces of information are additionally stored in the image buffer 213, the firmware image verifier 211 may obtain all of the pieces of information stored in the image buffer 213, and the obtained information may be a verification target. The firmware image verifier 211 may obtain information stored in the image buffer 213 based on a firmware image download command from the host device 100.

Based on the firmware image download command of the host device 100, n number of firmware image chunks stored in the image buffer 213 may be stored as one firmware image 110 in the memory device 220.

FIG. 7, FIG. 8, FIG. 9, and FIG. 10 are diagrams describing an operation of a memory controller according to an embodiment.

Hereinafter, an example will be described where the firmware image 110 is divided into n number firmware image chunks by the host device 100 and is transmitted to the storage device 200.

Also, an example where the image buffer 213 and the verification register 212 are changed over time will be described. That is, operations at a first time, a second time, a third time and a fourth time will be described with reference to FIG. 7, FIG. 8, FIG. 9, and FIG. 10.

The first time may denote a time before the storage device 200 receives a firmware image chunk by a firmware image download command. The second time may denote a time at which the storage device 200 receives one or more firmware image download commands. The one or more firmware image chunks are stored in the image buffer 213 based on the one or more firmware image download commands. The third time may denote a time at which the storage device 200 receives all of the n firmware image chunks and stores the n firmware image chunks in the image buffer 213. The fourth time may denote a time at which damage occurs in the firmware image 110 stored before a firmware commit command is received from the host device 100 and after all of the n firmware image chunks are stored in the image buffer 213.

Figure 7:
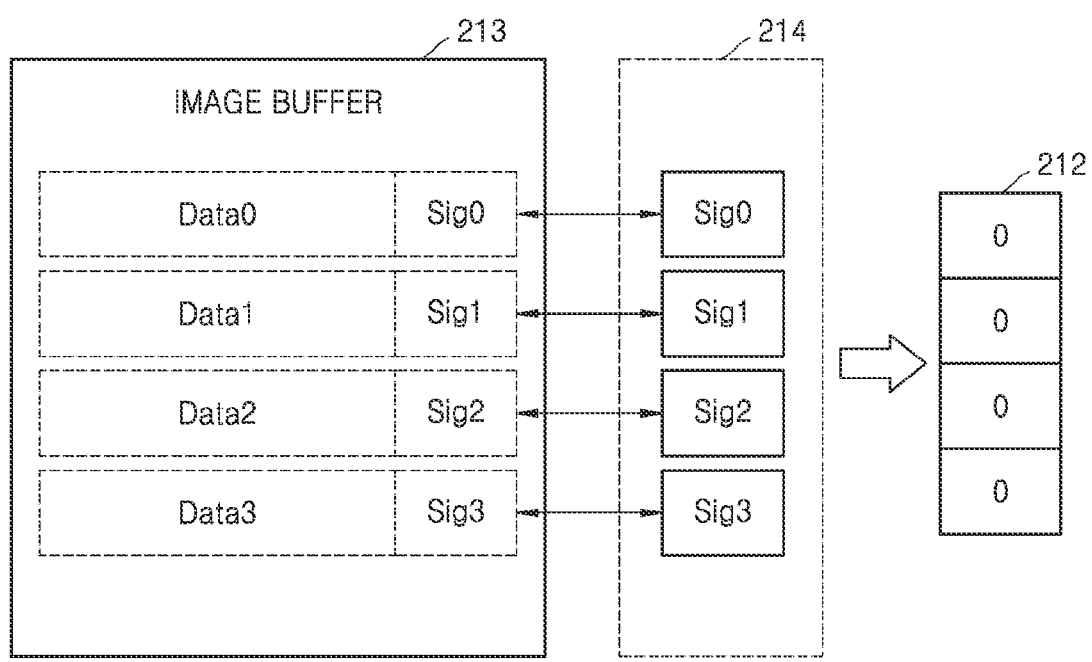
FIG. 7, FIG. 8, FIG. 9, and FIG. 10 are diagrams describing an operation of a memory controller according to an embodiment.

Referring to FIG. 7, the firmware image 110 may include four pieces of data Data0 to Data3 and four pieces of signatures Sig0 to Sig3.

The image buffer 213 may logically and/or physically divide an addressable area where the four pieces of data Data0 to Data3 and the four pieces of signatures Sig0 to Sig3 of the firmware image 110 are stored. The storage device 200 may receive information about the firmware image 110 from the host device 100 and may previously divide an area of the image buffer 213 based on the received information.

The firmware image verifier 211 may input information, stored in the image buffer 213, to the verification algorithm 214. The firmware image verifier 211 may compare a result, generated by the verification algorithm 214, with information stored in the second area of the image buffer 213.

For example, the firmware image verifier 211 may respectively compare signatures, stored in the second area of the image buffer 213, with results generated by inputting data stored in the first area of the image buffer 213 and the signatures stored in the second area of the image buffer 213 to the verification algorithm 214. When a signature generated by the verification algorithm 214 is the same as a stored signature, the firmware image verifier 211 may store 1 in the verification register 212. This may denote that verification of the integrity or validity of stored data is successful.

A size of the verification register 212 may be determined based on the number of pieces of data included in the firmware image 110 stored in the image buffer 213. For example, when the firmware image 110 includes four pieces of data Data0 to Data3, the verification register 212 may store four bits. Each bit may correspond to each piece of data of the firmware image 110.

When the signature generated by the verification algorithm 214 differs from the stored signature, the firmware image verifier 211 may store 0 in the verification register 212. This may denote that the verification of the integrity or validity of the stored data fails.

At the first time, the storage device 200 may be in a state where a firmware image chunk is not received thereby. Resultingly, the image buffer 213 may be empty.

Because there is no verification target, the firmware image verifier 211 may write all bits of the verification register 212 as 0.

Figure 8:
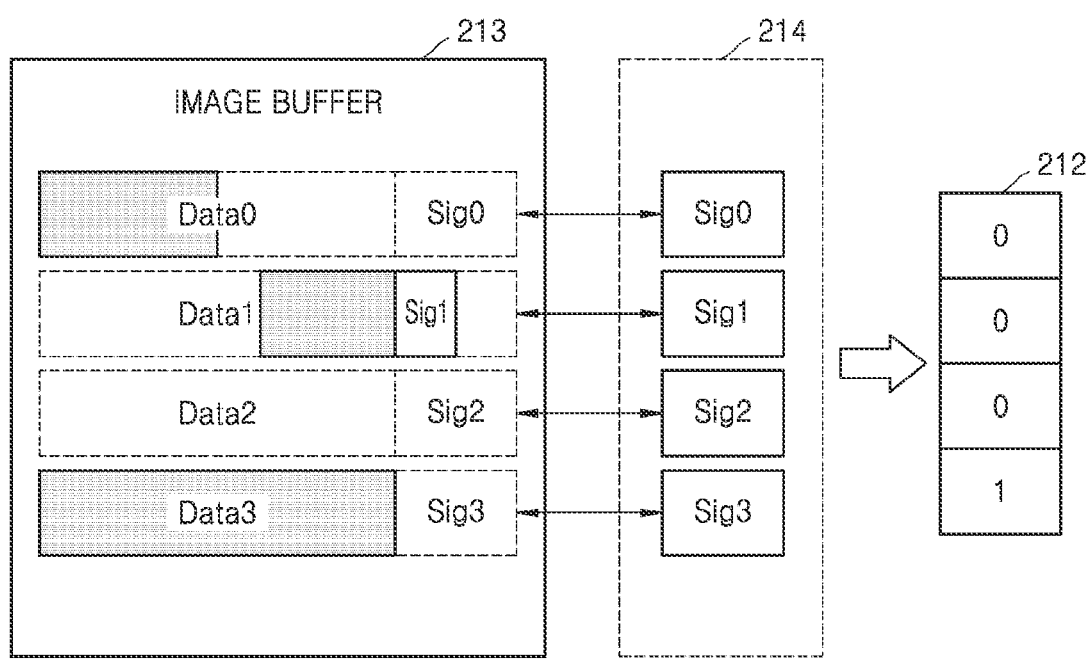

Referring to FIG. 8, at the second time, the storage device 200 may receive a plurality of firmware image chunks from the host device 100 and may store the received firmware image chunks in the image buffer 213.

A firmware image chunk may be generated by arbitrarily dividing the firmware image 110. Resultingly, a certain data area and a signature area corresponding thereto are not always included in the firmware image 110.

The memory controller 210 may check pieces of information included in a received firmware image chunk and may store the pieces of information in a predetermined area of the image buffer 213.

The firmware image verifier 211 may input all of the pieces of information, stored in the image buffer 213, to the verification algorithm 214 and may verify the validity or invalidity of the pieces of information.

For example, the firmware image verifier 211 may input a portion of first data Data0, a portion of second data Data1, all of fourth data Data3, a portion of a second signature Sig1, all of a third signature Sig2, and all of a fourth signature Sig3 of the firmware image 110 to the verification algorithm 214.

The firmware image verifier 211 may compare a plurality of signatures, generated by the verification algorithm 214, with pieces of information stored in the second area of the image buffer 213. In the embodiment described above, because only pieces of information about the fourth signature Sig3 and the fourth data Data3 of the firmware image 110 stored in the image buffer 213 are all stored, when the fourth data Data3 is valid, only a bit corresponding to the fourth data Data3 of the verification register 212 may be stored as 1.

Figure 9:
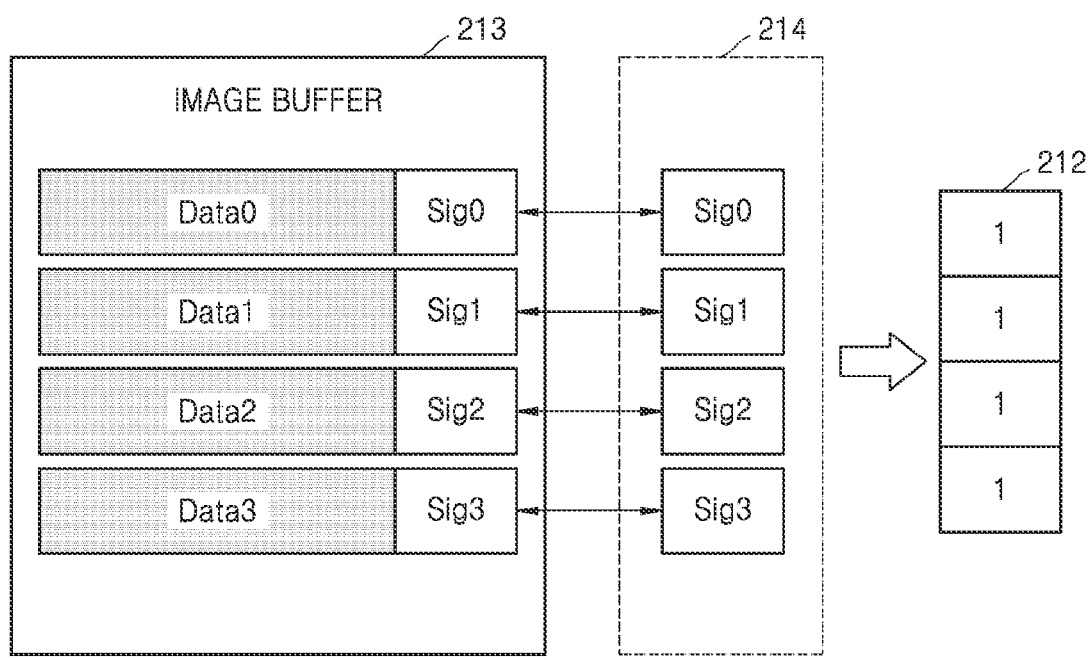

Referring to FIG. 9, at the third time, the storage device 200 may receive all of the n firmware image chunks and may store the received firmware image chunks in the image buffer 213. That is, the download of all firmware image chunks may be completed.

The firmware image verifier 211 may input all information, stored in the image buffer 213, to the verification algorithm 214 and may verify the information.

At this time, pieces of information stored in the image buffer 213 may not be damaged, and when the image buffer 213 is valid, signatures output from the verification algorithm 214 may respectively match signatures stored in the second area of the image buffer 213. In this case, the firmware image verifier 211 may store bits, corresponding to each data area of the verification register 212, as 1.

In this state, for example, when the storage device 200 receives a firmware commit command from the host device 100, the memory controller 210 may check a verification result stored in the verification register 212. Because all bits of the verification register are 1, this may denote that verification of data included in the firmware image 110 succeeds. Therefore, the memory controller 210 may store all pieces of information (i.e., one firmware image 110), stored in the image buffer 213, in the memory device 220, which is a non-volatile memory.

However, a problem where the firmware image 110 is damaged in the image buffer 213 may occur before the storage device 200 receives a firmware commit command from the host device 100.

Figure 10:
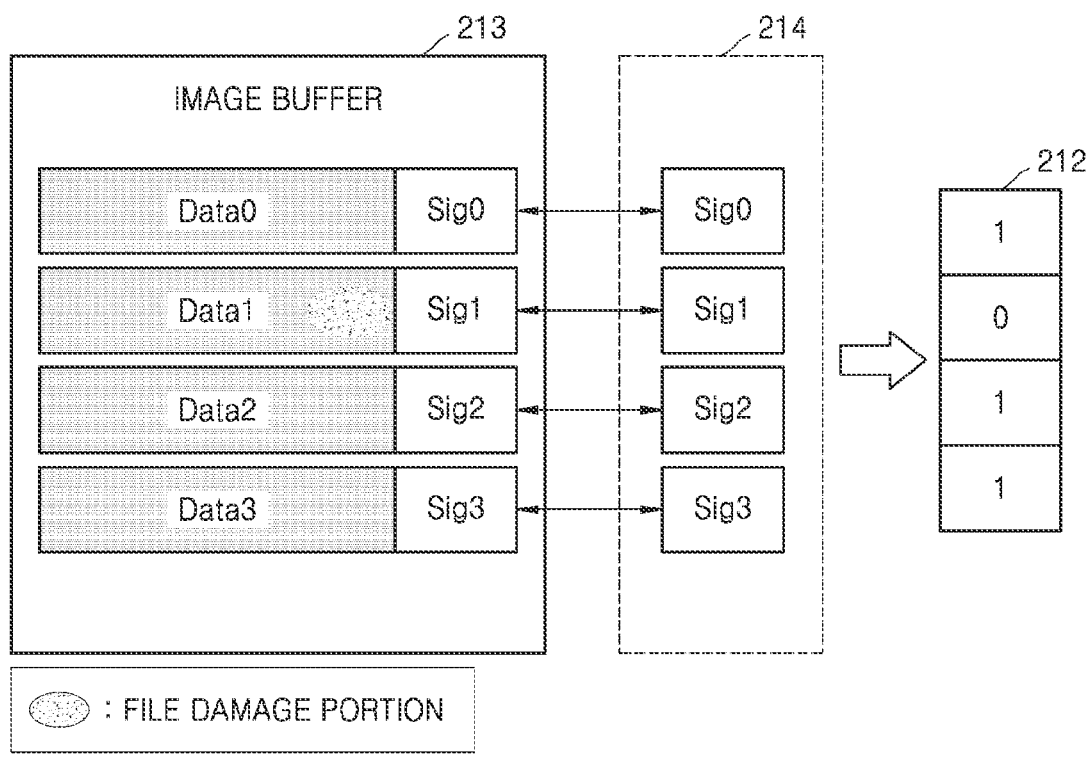

Referring to FIG. 10, whenever a firmware image chunk is stored in the image buffer 213, the firmware image verifier 211 may perform verification on pieces of information stored in the image buffer 213, or may perform verification on the pieces of information stored in the image buffer 213 at every predetermined period.

For example, as in FIG. 9, in a state where all bits of the verification register 212 are stored as 1 because verification of the firmware image 110 stored in the image buffer 213 succeeds, information corresponding to a second data area may be damaged.

The firmware image verifier 211 may input all of the pieces of information, stored in the image buffer 213, to the verification algorithm 214. Due to the damage of the second data Data1, verification of information stored in the second data Data1 may fail. In this case, a bit of the verification register 212 corresponding to the second data Data1 may be stored as 0.

According to the present embodiment, instead of performing verification on the firmware image 110 only when the firmware image 110 is received from the host device 100, the firmware image verifier 211 may perform verification on the firmware image 110 even after being stored in the image buffer 213. As a result, a verification result from the verification by the firmware image verifier 211 may reflect whether data is/are damaged in a download process or a verification process.

Figure 11:
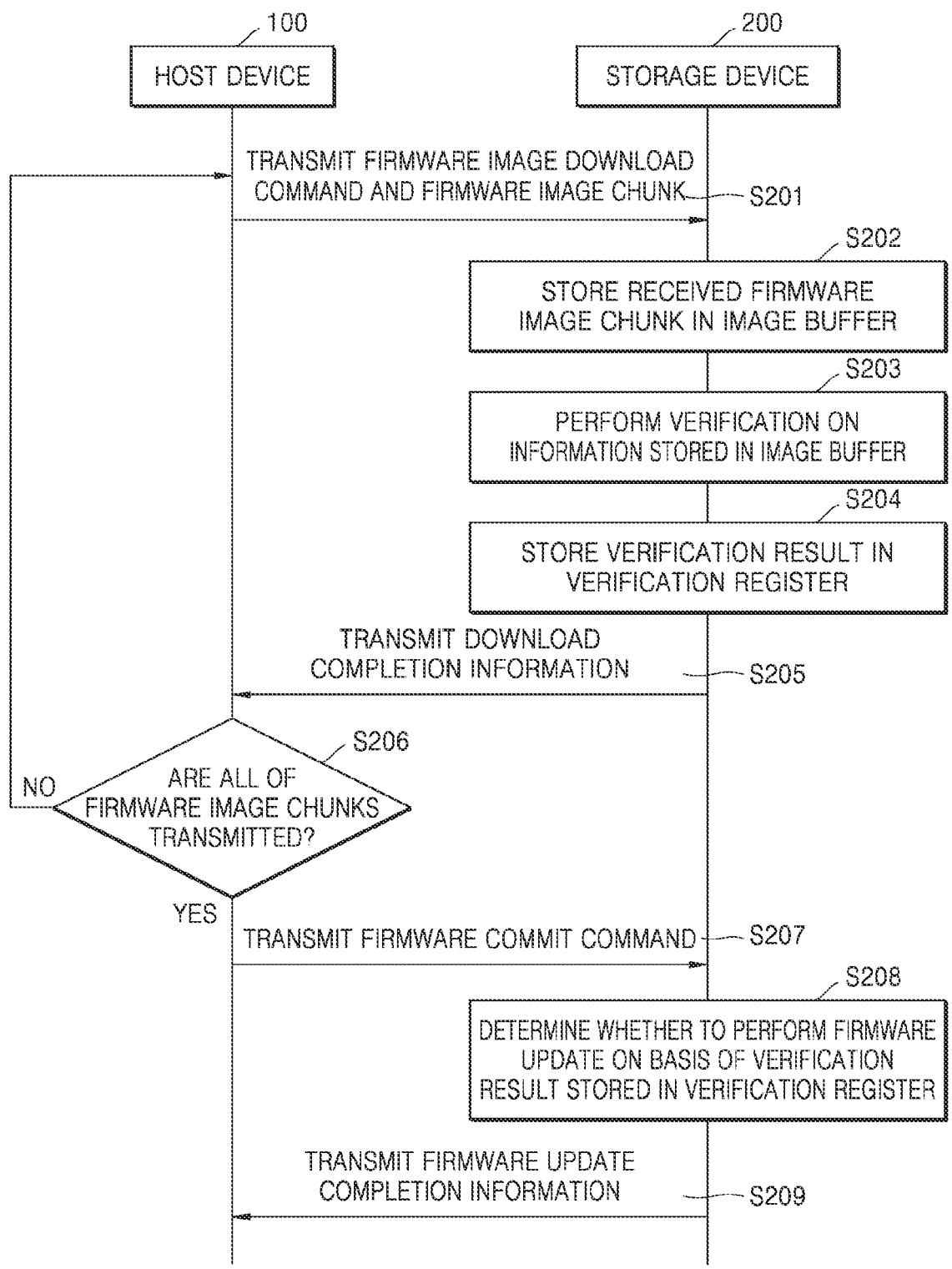
FIG. 11 is a flowchart illustrating an operating method of a data processing system according to an embodiment.

FIG. 11 is a flowchart illustrating an operating method of a data processing system, according to an embodiment.

Hereinafter, an example will be described where the host device 100 divides the firmware image 110 into n number of firmware image chunks.

Referring to FIGS. 1, 4, and 11, in operation S201, the host device 100 may transmit, to the storage device 200, a firmware image download command and a firmware image chunk which is to be downloaded. For example, the host device 100 may store the firmware image download command in a submission queue. In this case, information about a firmware image chunk may be stored in the submission queue. The storage device 200 may receive a firmware image chunk based on information stored in the submission queue.

The firmware image download command according to the present embodiment may include a verification command of the firmware image 110. Therefore, the storage device 200 may receive a firmware image download command and may perform verification on a firmware image chunk before receiving a firmware commit command.

The storage device 200 may store the firmware image chunk, received from the host device 100, in the image buffer 213 in operation S202. As described above with reference to FIG. 8, the image buffer 213 may divisionally store data and a signature of the received firmware image chunk.

In operation S203, the storage device 200 may perform verification on information stored in the image buffer 213. The firmware image verifier 211 may perform verification on all of the pieces of information previously stored in the image buffer 213, in addition to a firmware image chunk which was stored in the image buffer 213 in operation S202. The pieces of information previously stored in the image buffer 213 may be a portion of the firmware image 110.

The firmware image verifier 211 may verify whether the pieces of information previously stored in the image buffer 213 are damaged or are validly generated. For example, verification may be performed on validity or integrity. A method of verifying the pieces of information stored in the image buffer 213 by using the firmware image verifier 211 is not limited to performance on validity or integrity.

The storage device 200 may store a verification result in the verification register 212 in operation S204. For example, when the firmware image 110 is divided into four pieces of data and four signatures, the verification register 212 may include four bits corresponding to each piece of data.

A structure of the verification register 212 is not limited to an arbitrary structure, and the verification register 212 may be implemented to have a structure for storing a verification result of the firmware image 110.

At S205, the storage device 200 may transmit download completion information, associated with a firmware image chunk received in S201, to the host device 100. For example, the storage device 200 may transmit a completion queue to the host device 100.

In FIG. 11, a process of transmitting the download completion information is illustrated as being performed after verification, but is not limited to this relative timing and may be performed earlier such as immediately after operation S201.

The host device 100 may check whether all of the firmware image chunks are transmitted to the storage device 200 in operation S206. At S207, the host device 100 may transmit a firmware commit command to the storage device 200. When all of the firmware image chunks are transmitted, operation S207 may be performed, and when all of the firmware image chunks are not transmitted, operation S201 may be performed again. Operations S201 to S206 may be repeatedly performed until transmission of all of the firmware image chunks is completed. As operations S201 to S206 are repeatedly performed, the image buffer 213 and the verification register 212 may be updated.

The host device 100 may transmit a firmware commit command to the storage device 200 in operation S207. The firmware commit command may include a firmware update request of the storage device 200. The firmware commit command according to the present embodiment does not include a verification command of the firmware image 110 and instead includes a command for checking a result of the verification register 212.

The firmware commit command may include different commit actions. For example, the firmware commit command may allow a firmware update to be performed with a new firmware image 110 and may allow the reset or not of the storage device 200 to be designated.

The storage device 200, which has received the firmware commit command, may check a verification result stored in the verification register 212 and may determine whether to perform a firmware update based on the verification result in operation S208.

For example, when all firmware image chunks are determined to be valid, and a determination result is stored in the verification register 212, the storage device 200 may store pieces of information (i.e., the firmware image 110), stored in the image buffer 213, in the memory device 220 of the storage device 200 and may perform a firmware update. Detailed processes of operation S208 will be described below in detail with reference to FIG. 12.

According to the present embodiment, the storage device 200 may perform verification on the firmware image 110 and may receive the firmware commit command. After the storage device 200 receives the firmware commit command, a verification performance result may be checked instead of performing separate firmware image verification. As a result, a time for processing the firmware commit command may be reduced.

In response to the firmware commit command, the storage device 200 may transmit firmware update completion information to the host device 100 in operation S209. In this case, a response to the firmware commit command may denote an operation which starts to be performed by receiving the firmware commit command. For example, when a firmware update is performed as verification of the firmware image 110 succeeds, the firmware update completion information may include a firmware update success history.

Figure 12:
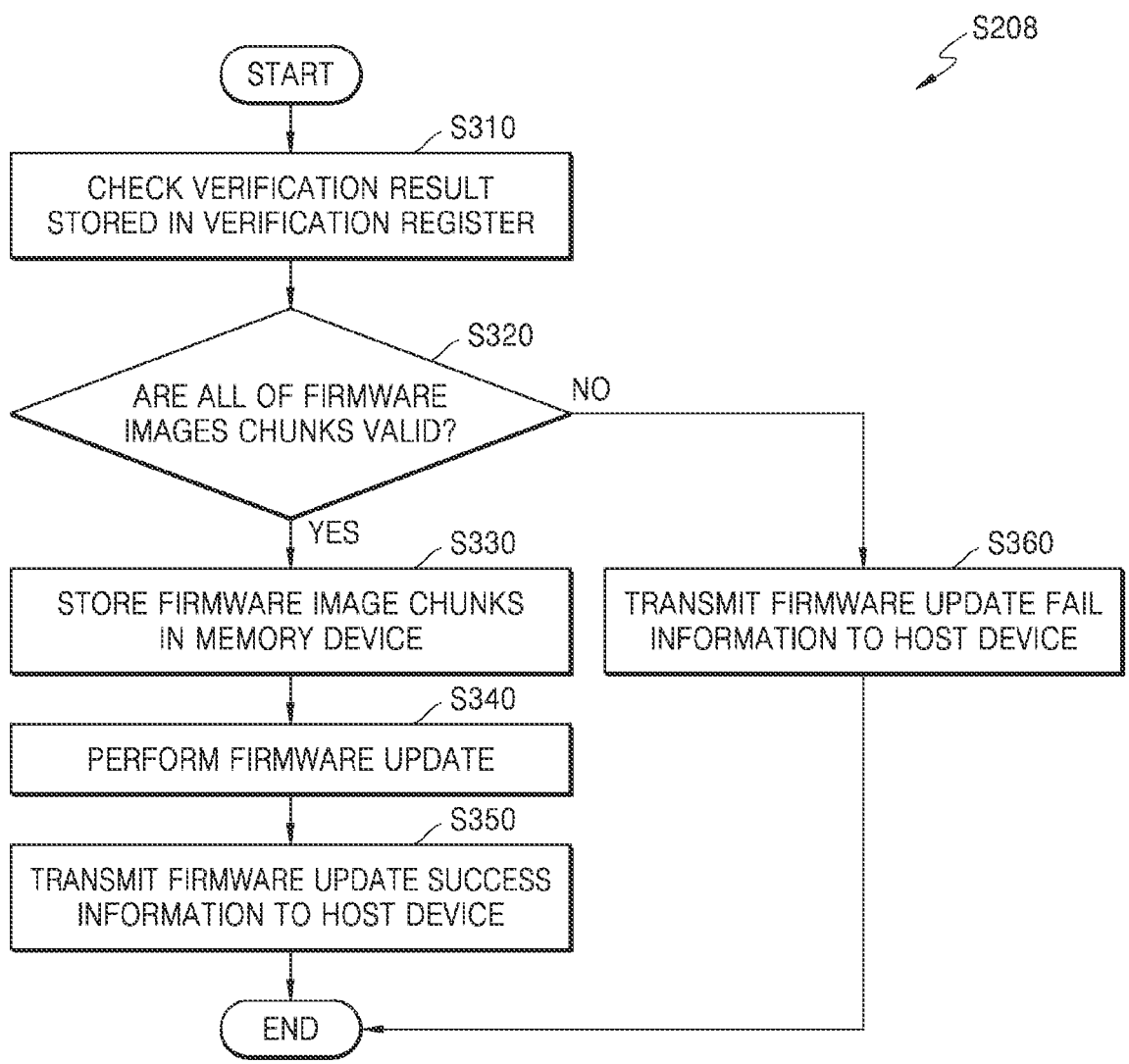
FIG. 12 is a flowchart illustrating an operating method of a storage device according to an embodiment.

FIG. 12 is a flowchart illustrating an operating method of a storage device according to an embodiment.

Referring to FIGS. 4 and 12, the storage device 200, which has received a firmware commit command, may check a verification result stored in the verification register 212 in operation S310. The verification register 212 may include content representing the validity or invalidity of firmware image chunks. Also, when the firmware image 110 includes a plurality of data areas, the content may represent the validity or invalidity of each piece of data.

The storage device 200 may check whether all of the firmware image chunks are valid, based on the verification result in operation S320. For example, the storage device 200 may check whether all bits included in the verification register 212 are 1.

When the firmware image 110 is stored in the verification register 212 in a state which is valid (S320=Yes), the storage device 200 may perform operation S330. When the firmware image 110 is stored in the verification register 212 in a state where at least one of piece of data of the firmware image 110 is not valid (S320=No), operation S360 may be performed.

When all firmware image chunks stored in the image buffer 213 are determined to be valid (S320—Yes), the storage device 200 may store the firmware image chunks, stored in the image buffer 213, in the memory device 220 in operation S330.

The storage device 200 may perform a firmware update based on the firmware image 110 stored in the memory device 220 in operation S340.

Subsequently, the storage device 200 may transmit firmware update success information to the host device 100 in response to the firmware commit command in operation S350.

When at least one piece of data of the firmware image 110 is not valid in operation S320 (S320=No), the storage device 200 may transmit firmware update fail information to the host device 100 in response to the firmware commit command in operation S360.

Figure 13:
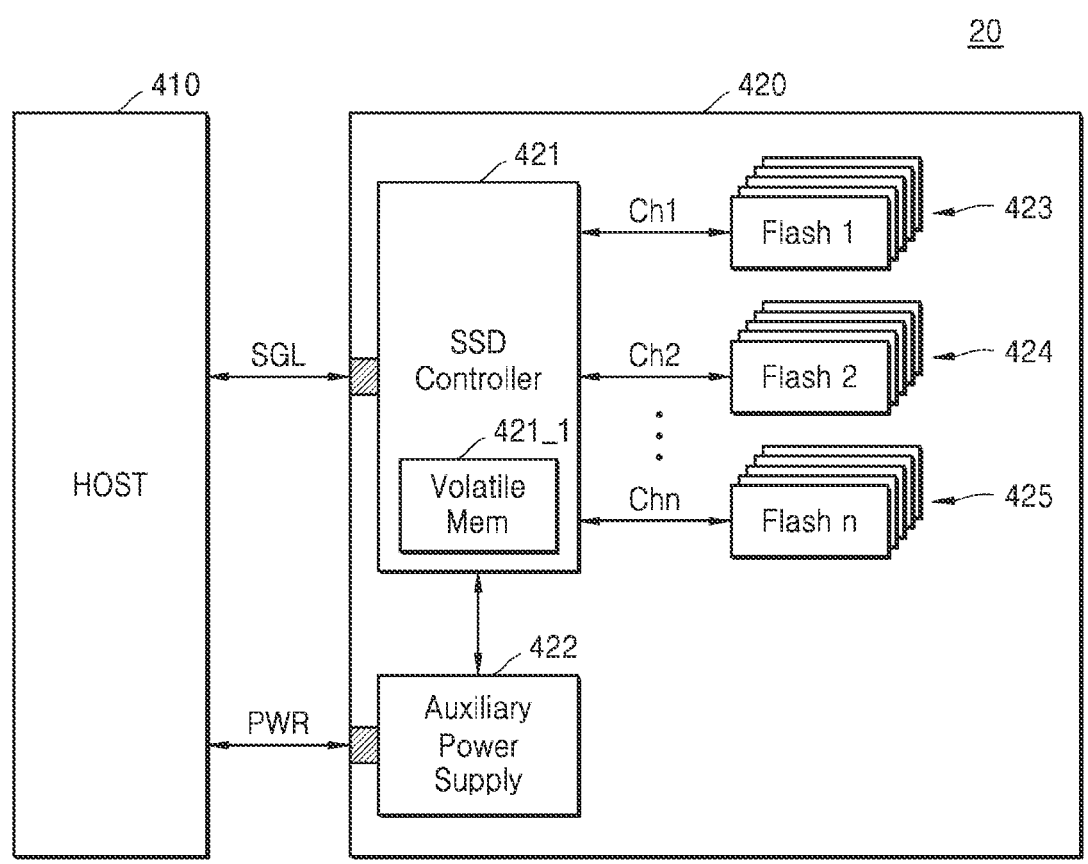
FIG. 13 is a flowchart illustrating an example where a memory device according to an embodiment is applied to a solid state drive (SSD) system.

FIG. 13 is a flowchart illustrating an example where a memory device according to an embodiment is applied to an SSD system.

Referring to FIG. 13, a data processing system 20 may include a host 410 and an SSD 420.

The SSD 420 may be implemented by using the embodiments described above with reference to FIGS. 1 to 12, may transmit and receive a signal to and from the host 410 through a signal connector SGL, and may be supplied with power through a power connector PWR.

The SSD 420 may receive a firmware image download command, a firmware image 110, which is to be downloaded, or a firmware commit command through the signal connector SGL.

The SSD 420 may include a controller 421, an auxiliary power supply 422, and a plurality of memory systems 423, 424, and 425. Each of the plurality of memory systems 423, 424, and 425 may include one or more flash memory devices as a storage device. Also, each of the one or more flash memory devices may include one or more dies, and one or more blocks may be disposed in each of the dies.

According to the embodiments described above, the controller 421 may communicate with the plurality of memory systems 423, 424, and 425 through a plurality of channels Ch1 to Chn and may perform verification on the firmware image 110 in the SSD 420 and an update operation based on the firmware image 110.

Also, the controller 421 may temporarily store the firmware image 110 received from the host 410 or a firmware image chunk of the firmware image 110 in a volatile memory 421_1 of the controller 421 or the plurality of memory systems 423, 424, and 425.

The controller 421 may include a firmware image verifier (not shown) for performing verification on the firmware image 110, and the firmware image verifier (not shown) may be implemented based on hardware, software, or a combination thereof.

While the inventive concept(s) described herein have been particularly shown and described with reference to embodiments herein, it will be understood that various changes in form and details may be made therein without departing from the spirit and scope of the following claims.

What is claimed is:

1. A controller that is included in a storage device communicating with a host device, the controller comprising:
   a buffer configured to store a first firmware image chunk corresponding to a first firmware image download command received from the host device; and
   a register configured to store a verification result of the first firmware image chunk obtained through verification performed based on receiving the first firmware image chunk,
   wherein the controller is configured to:
   receive a firmware image download command and a firmware image corresponding to the firmware image download command from the host device,
   obtain a verification result by performing verification for determining whether the firmware image is damaged in response to the received firmware image download command,
   when a firmware update request for the firmware image is received from the host device, determine whether to perform a firmware update based on the firmware image by using the verification result,
   receive a second firmware image chunk, store the second firmware image chunk in the buffer, perform verification on the first firmware image chunk and the second firmware image chunk each stored in the buffer, and store a verification result of each of the first firmware image chunk and the second firmware image chunk in the register.

2. The controller of claim 1, wherein the firmware image comprises a data area including firmware update information and an authentication area including authentication information corresponding to the firmware update information and is divided into a plurality of firmware image chunks by the host device.

3. The controller of claim 2, wherein the buffer comprises a first area configured to store the firmware update information and a second area configured to store the authentication information.

4. The controller of claim 3, wherein the controller is configured to perform verification on a validity of data stored in the first area based on the authentication information stored in the second area.

5. The controller of claim 1, wherein the controller is configured to perform the verification by using authentication information included in the first firmware image chunk and authentication information included in the second firmware image chunk.

6. The controller of claim 1, comprising:
   a buffer configured to store the firmware image received from the host device; and
   a register configured to store a verification result of the firmware image, wherein,
   when the firmware image stored in the buffer is determined to be valid, the controller is configured to store the firmware image in a memory device and to perform a firmware update by using the firmware image stored in the memory device.

7. A firmware update method of a storage device, the firmware update method comprising:
   receiving a firmware image download command and a firmware image corresponding to the firmware image download command from a host device;
   obtaining a verification result by performing verification for determining whether the firmware image is damaged in response to the received firmware image download command;
   receiving a firmware update request for the firmware image from the host device;
   checking the verification result to determine whether to perform a firmware update based on the firmware image, based on the verification result; and
   storing a first firmware image chunk in a buffer,
   wherein the storing of the first firmware image chunk stored in the buffer comprises storing firmware update data of the first firmware image chunk in a first area of the buffer and storing authentication information about the first firmware image chunk in a second area of the buffer
   wherein the performing of the verification for determining whether the firmware image is damaged comprises performing verification on a validity of a plurality of firmware image chunks stored in the buffer based on the authentication information stored in the second area and storing a verification result in a register.

8. The firmware update method of claim 7, wherein the receiving of the firmware image comprises:
   receiving the first firmware image chunk, obtained through division by the host device, from the host device; and
   the firmware image comprises a data area including firmware update information and an authentication area including authentication information corresponding to the firmware update information.

9. The firmware update method of claim 8, wherein the storage device is configured to receive a second firmware image chunk from the host device, store the second firmware image chunk in the buffer, and perform verification on the first firmware image chunk and the second firmware image chunk each stored in the buffer.

10. The firmware update method of claim 8, wherein the determining of whether to perform the firmware update based on the firmware image comprises:
    checking the verification result stored in the register;
    when all of the plurality of firmware image chunks stored in the buffer are valid, storing the plurality of firmware image chunks in a memory device; and
    performing the firmware update based on the plurality of firmware image chunks stored in the memory device.

11. A storage device for performing a firmware update, the storage device comprising:
 a memory device; and
 a controller configured to receive a firmware image download command and a firmware image corresponding to the firmware image download command from a host device, obtain a verification result by performing verification for determining whether the firmware image is damaged based on the received firmware image download command, receive a firmware update request for the firmware image from the host device, check the verification result, and when the firmware image is determined to be valid as a result of checking the verification result, store the firmware image in the memory device, wherein the firmware update is performed based on the firmware image stored in the memory device,
wherein the controller is configured to store the firmware image in a buffer,
wherein the controller is configured to receive a plurality of firmware image chunks from the host device and to store the plurality of firmware image chunks in the buffer,
the buffer comprises a first area and a second area, and
the second area of the buffer is configured to store pieces of authentication information about the plurality of firmware image chunks.

12. The storage device of claim 11, wherein
the first area is configured to store firmware update information about the firmware image and the second area is configured to store authentication information corresponding to the firmware update information.

13. The storage device of claim 11, wherein, when all of the plurality of firmware image chunks stored in the buffer are valid,
 the controller is configured to store the plurality of firmware image chunks in the memory device.

14. The storage device of claim 12, wherein the controller is configured to store a verification result of the firmware image in a register, and when the firmware update request is received, check the verification result stored in the register.

15. The storage device of claim 12, wherein, when the firmware image stored in the buffer is damaged, the controller is configured to store damage information about the firmware image in a register.

* * * * *